US011384017B2

(12) United States Patent
Skocek et al.

(10) Patent No.: US 11,384,017 B2
(45) Date of Patent: Jul. 12, 2022

(54) METHOD FOR MANUFACTURING BINDERS HARDENING BY HYDRATION AND CARBONATION

(71) Applicant: HConnect 2 GmbH, Heidelberg (DE)

(72) Inventors: Jan Skocek, Leimen (DE); Maciej Zajac, Heidelberg (DE); Gerd Bolte, Schriesheim (DE); Mohsen Ben Haha, Heidelberg (DE)

(73) Assignee: HConnect 2 GmbH, Heidelberg (DE)

( * ) Notice: Subject to any disclaimer, the term of this patent is extended or adjusted under 35 U.S.C. 154(b) by 267 days.

(21) Appl. No.: 16/754,411

(22) PCT Filed: Oct. 2, 2018

(86) PCT No.: PCT/EP2018/076798
§ 371 (c)(1),
(2) Date: Apr. 8, 2020

(87) PCT Pub. No.: WO2019/072640
PCT Pub. Date: Apr. 18, 2019

(65) Prior Publication Data
US 2020/0392043 A1   Dec. 17, 2020

(30) Foreign Application Priority Data
Oct. 9, 2017   (EP) ..................................... 17195454

(51) Int. Cl.
| C04B 28/02 | (2006.01) |
| C04B 7/44 | (2006.01) |
| C04B 7/47 | (2006.01) |
| C04B 7/52 | (2006.01) |
| C04B 40/00 | (2006.01) |
| C04B 40/02 | (2006.01) |

(52) U.S. Cl.
CPC ............... *C04B 28/02* (2013.01); *C04B 7/44* (2013.01); *C04B 7/47* (2013.01); *C04B 7/527* (2013.01); *C04B 40/0042* (2013.01); *C04B 40/0231* (2013.01)

(58) Field of Classification Search
CPC ......... C04B 7/345; C04B 7/3453; C04B 7/44; C04B 7/47; C04B 7/527; C04B 28/02; C04B 28/188; C04B 40/0042; C04B 40/0231; Y02P 40/10
See application file for complete search history.

(56) References Cited

U.S. PATENT DOCUMENTS

| 5,744,078 A | 4/1998 | Soroushian et al. |
| 6,190,449 B1 | 2/2001 | Beauvent |
| 6,334,885 B1 | 1/2002 | Fukushima et al. |
| 9,751,771 B2 | 9/2017 | Hunsinger et al. |
| 10,173,925 B2 | 1/2019 | Atakan et al. |
| 10,301,217 B2 | 5/2019 | Hill et al. |
| 11,111,177 B2 * | 9/2021 | Itul ........................ C04B 7/3453 |
| 2011/0165400 A1 | 7/2011 | Quaghebeur et al. |
| 2012/0312194 A1 | 12/2012 | Riman et al. |
| 2017/0073270 A1 | 3/2017 | Shao et al. |
| 2019/0152856 A1 | 5/2019 | Atakan et al. |
| 2019/0241471 A1 | 8/2019 | Hill et al. |

FOREIGN PATENT DOCUMENTS

| DE | 1047104 B | 12/1958 |
| DE | 19603965 A1 | 7/1997 |
| DE | 102012107022 B3 | 12/2013 |
| WO | 2007017142 A2 | 2/2007 |
| WO | 2016022485 A1 | 2/2016 |
| WO | 2016105383 A1 | 6/2016 |

OTHER PUBLICATIONS

International Search Report of PCT/EP2018/076798 dated Dec. 11, 2018.
Kristin Majcher: "What happened to Green Concrete? Concrete that absorbs carbon dioxide has made slow progress but is finally hitting the market" Mar. 19, 2015, https://www.technologyreview.eom/s/535646/what-happened-to-green-concrete.
M. Nakamura et al.: "Improvement of the frost durability of vinylon fiber reinforced cement board", J. Ceram. Soc. Japan, vol. 104 (1992) pp. 990-993.
F.P. Glasser: "Advances in Cement Clinkering," Chapter 3.4 of "Innovations in Portland cement manufacturing", edited by J.I. Bhatty, PCA 2011, pp. 331-368.
R. Berger and J. F. Young, "Reaction of Calcium Silicates with Carbon Dioxide and Water," Illinois Univ at Urbana-Champaign, 1979, pp. 1-38.
International Preliminary Report on Patentability for PCT/EP2018/076798 dated Jan. 24, 2020.

* cited by examiner

*Primary Examiner* — Anthony J Green
(74) *Attorney, Agent, or Firm* — Collard & Roe, P.C.

(57) ABSTRACT

A method for manufacturing a binder of a hydratable material includes providing a starting material from one or more raw materials convertible by tempering at 600 to 1200° C. into the hydratable material, tempering the starting material to provide the hydratable material containing not more than 10% by weight monocalcium silicate and at least 15% by weight hydratable phases in the form of lime and dicalcium silicate, wherein the residence time and the tempering temperature are adapted to obtain the hydratable material by converting not more than 80% by weight of the starting material, and cooling the hydratable material to provide the binder comprising the hydratable material. The binder can be mixed with water and optionally one or more of aggregate, additives, admixtures to obtain a binder paste that is placed, hydrated and carbonated to produce a building product.

22 Claims, 1 Drawing Sheet

METHOD FOR MANUFACTURING BINDERS HARDENING BY HYDRATION AND CARBONATION

CROSS REFERENCE TO RELATED APPLICATIONS

This application is the National Stage of PCT/EP2018/076798 filed on Oct. 2, 2018, which claims priority under 35 U.S.C. § 119 of European Application No. 17195454.8 filed on Oct. 9, 2017, the disclosures of which are incorporated by reference. The international application under PCT article 21(2) was published in English.

BACKGROUND OF THE INVENTION

The present invention relates to method for manufacturing a binder that relies on hydration with subsequent carbonation for hardening and to a method of manufacturing building elements therefrom.

Cement and products containing it like concrete, mortar etc. are wide spread and versatile construction materials. However, cement is also responsible for a considerable amount of $CO_2$ emission, as well as requiring large amounts of valuable raw materials. Thus, many different proposals for saving natural raw materials, energy and $CO_2$ emission have been made.

One of them is the use of binders hardening through carbonation, see e.g. US 2011/0165400 A1, US 2012/0312194 A1, and WO 2016/022485 A1. Already the reduction of the Ca/Si ratio in the raw material decreases the amount of $CO_2$ released and the absorption of it during hardening multiplies the effect. This and further approaches are also described in https://www.technologyreview.com/s/535646/what-happened-to-green-concrete. Accordingly, Novacem relied on a replacement of Portland cement with magnesium oxide material that hardens by carbonation. Calera reacts carbon dioxide from exhaust gases to form calcium carbonate powder (vaterite polymorph) that in turn is useful as a binder (forming continuous aragonite structures). Carbstone and Solidia rely on materials that harden directly by carbonation.

However, in contrast to Portland cement hardening through hydration with the water present in the paste the carbonating binders need $CO_2$ in relevant amounts and also in high concentration when hardening shall take place without long curing times. Although $CO_2$ is present in the pore solution of the paste, its amount is usually not sufficient for hardening. Supply from the surrounding atmosphere via diffusion takes too long to be of technological relevance. So elevated temperatures and aqueous solutions of $CO_2$ are deemed necessary. These are expensive and also not possible for all uses.

It has been proposed to accelerate hardening or enhance strength of articles made with slag as a binder by exposing them to carbon dioxide mostly in combination with steam and at elevated pressure and/or temperature, see e.g. DE 1 047 104 A1, M. Nakamura et al., "Improvement of the frost durability of vinylon fiber reinforced cement board", J. Ceram. Soc. Japan, Vol. 104 (1992) pages 990-993, U.S. Pat. Nos. 5,744,078 A, 6,334,885 B1, and US 2017/0073270 A1.

Last but not least, in the article mentioned above, https://www.technologyreview.com/s/535646/what-happened-to-green-concrete, the concept of CarbonCure is described. According to that approach carbon dioxide gathered from various exhaust gases is provided inside a tank and added to concrete during mixing. Thereby, hydration and carbonation proceed together from the beginning.

The presently known systems require either high-grade precursor materials or costly manufacturing (Novacem, Calera, CarbonCure) or demand (expensive) curing conditions (Solidia, Carbstone). Thus, the object remains to find binders that are both easy and cheap to make and to work with and harden sufficiently fast giving products with the desired strength and durability.

Surprisingly it was now found that a hydratable material with low calcium content obtained in a partial transformation process of low grade siliceous and calcareous precursor materials at 600 to 1200° C. leaving a part of the precursor materials unconverted provides a binder able to harden by hydration and only after partial hydration in addition by carbonation. Transformation of the material to the final state occurs by a combined hardening through hydration and carbonation and results in products with sufficient strength and durability.

SUMMARY OF THE INVENTION

The above object is solved by a method for manufacturing a binder comprising a hydratable material comprising the steps providing a starting material convertible by tempering into the hydratable material, wherein the starting material has a Ca/Si molar ratio from 0.5 to 1.8 and contains up to 30% by weight of other elements than CaO and $SiO_2$ with regard to the total mass calculated as oxides from one or more raw materials, tempering the starting material at a temperature in the range from 600 to 1200° C., preferably between 800 to 1100° C., most preferably between 850 and 1050° C., during a residence time from 1 minute to 5 hours, preferably 5 minutes to 2 hours, to provide the hydratable material containing not more than 10% by weight monocalcium silicate and at least 15% by weight hydratable phases in the form of lime and dicalcium silicate, wherein at least 50% of the crystalline hydratable phases are dicalcium silicate, wherein the residence time and the tempering temperature are adapted to obtain the said hydratable material by converting not more than 80% by weight of the starting material, cooling, and—if the hydratable material is coarser—grinding the hydratable material to a fineness according to the determination of the particle size distribution by laser granulometry of $D_{90} \leq 90$ μm and preferably $D_{90} \leq 60$ μm, whereby the Rosin-Rammler Parameter (slope) n can vary from 0.6-1.4, and preferably from 0.7 to 1.2, to provide the binder comprising the hydratable material. Typically, the hydratable material contains at least 15% by weight dicalcium silicate, at least 3% by weight CaO, less than 10% by weight wollastonite, and from 20 to 80% by weight phases from the raw materials and/or formed during the transformation step e.g. quartz, $C_3S_2$, $C_3S$, $C_3A$, $C_4AF$, gehlenite, merwenite, altered hydrated phases, glassy and/or X-ray amorphous components, and other rock- and soil-forming minerals. A preferred amount of hydratable phases is 18% by weight with respect to the hydratable material. Typically after the partial conversion the hydratable material contains at least 20% non-hydraulic phases, that may be as well not carbonatable, and a maximum of 5% by weight $CO_2$ in form of carbonates, preferably ≤2% by weight and most preferred none, as the result of incomplete material conversion.

The above object is further solved by a method of manufacturing building elements comprising manufacturing a binder comprising a hydratable material as described, mixing the binder with water to provide a binder paste, placing the binder paste, typically by filling into a mould or formwork, hydrating the binder paste until the amount of bound water is at least 5% of the mass of hydraulic phases mass in the dry binder without completely hydrating the hydratable phases, and subjecting the partly hydrated binder paste to carbonation to provide strength until the bound carbon dioxide is at least 150% of the initially bound water mass and/or the strength exceeds 2 MPa, while the bound water mass after carbonation is at least 50% of the bound water mass after hydration.

Dicalcium silicate is used as a term for several types of $C_2S$ such as, but not limited to, beta-$C_2S$, gamma-$C_2S$, and different types of alpha-$C_2S$ as well as forms with substitution by foreign elements like bredigite. Typically, dicalcium silicates are present in several polymorphs in clinkers like OPC and CSA and form complex solid solutions by incorporating foreign elements. These solid solutions are also included in the term dicalcium silicate. Similarly, all phases mentioned by their stoichiometric formulas are meant to include phases containing impurities and/or be present in form of solid solutions unless otherwise indicated.

The term monocalcium silicate designates CS phases such as wollastonite and pseudo-wollastonite. Lime denotes calcium oxide, CaO.

The usual cement chemist notation for oxides is mostly used herein, i.e. H—$H_2O$, C—CaO, A—$Al_2O_3$, F—$Fe_2O_3$, M—MgO, S—$SiO_2$ and $-$SO_3$.

Unless specified otherwise, the term reactive denotes hydraulic reactivity, i.e. the reaction of a substance with water to form hydrates and, as a rule, develop mechanical strength thereby. Carbonatable material means a material which reacts with carbon dioxide within technically appreciable times (such as a few hours up to 1 day) under the following conditions: 100% by volume $CO_2$ at 2 to 5 bar and 20° C.

The binder made according to the invention has a lower molar Ca/Si ratio than Portland cement (OPC). This results in less energy consumption and $CO_2$ release for calcination of limestone compared to that needed for Portland cement clinker. Partial transformation needs less energy compared to OPC clinker, too. Hence, the material made according to the invention uses less natural raw materials to achieve a performance comparable to OPC.

In contrast to proposals relying on CS (wollastonite, pseudo wollastonite) or other directly carbonating phases as reactive phase a considerable amount of hydratable phases in the form of dicalcium silicate and CaO are present, whereby also dicalcium silicate polymorphs deemed less reactive or inert are useful. Due to the low transformation temperature the dicalcium silicate is hydraulically reactive and able to provide green strength in construction material systems. Useful polymorphs are a, p, y and all other known forms. The amount of hydratable phases is at least 18% by weight, preferably at least 30% by weight and most preferred at least 45% by weight. X ray amorphous phases can also form part of the hydratable phases. In a preferred embodiment, the amount of dicalcium silicate is at least 80% of the crystalline hydratable phases. Suitably, the amount of dicalcium silicate with respect to the hydratable material is at least 15% by weight, preferably at least 25% by weight, and most preferred at least 35% by weight, and the amount of CaO is at least 3% by weight, preferably at least 5% by weight, and most preferred at least 10% by weight.

The content of wollastonite including other polymorphs of monocalcium silicate such as e.g. pseudo wollastonite-polymorphs should be below 10% by weight according to the invention, preferably below 6% by weight. CS consumes CaO and $SiO_2$ from the starting material without providing desirable hydratable phases. The tempering conditions should be adapted to avoid CS as much as possible, therefore. The phases relied upon for carbonation hardening are foremost calcium silicate hydrates, and also e.g. calcium aluminate hydrates, calcium aluminate sulfate and carbonate hydrates, hydrogarnet like phases, hydrotalcite like phases and metal hydroxides, e.g. portlandite, brucite, alumina hydroxide, goethite, iron hydroxide. These phases are present in the hydratable material and binder as not or partially transformed raw materials and as phases formed during hydration of dicalcium silicate, tricalcium silicate and other calcium silicates with Ca/Si>1. Calcium aluminates and calcium ferrites are remaining or formed during transformation and during hydration of CaO and other hydraulic phases. Of course, a small amount of wollastonite and other non-hydraulic phases or minor phases with calcium and/or magnesium might also carbonate in the binder made according to the invention.

A very useful phase is constituted by the amorphous, hydraulic calcium-alumina-magnesium-alkali-iron silicates that remain during tempering or are formed at the lower temperatures (compared to Portland cement) used during tempering. The hydraulic calcium-alumina-magnesium-alkali-iron silicates can account for up to 10% by weight of the reactive phases, or up to 30% by weight or up to 40% by weight.

Further very beneficial components of the hydratable material and binder according to the invention are calcium-iron-aluminates, calcium aluminates, and MgO, that show relevant hydraulic reactivity in the binder obtained according to the invention. Calcium-iron-aluminates, calcium aluminates, and MgO can account for up to 10% by weight of the reactive phases, or up to 30% by weight or up to 40% by weight.

Figure 1:
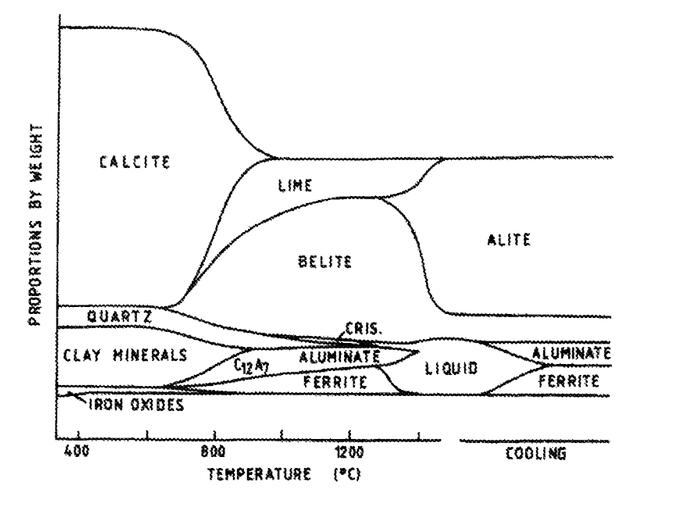
FIG. 1 presents the dependence of phase composition on temperature for Portland clinker manufacturing.

Suitable raw materials are those that can be converted into hydratable phases by tempering at 600 to 1200° C. FIG. 1 presents the dependence of phase composition on temperature for Portland clinker manufacturing, reproduced from Taylor, "Cement Chemistry", $2^{nd}$ edition, Thomas Telford Services Ltd., 1997. Similar behavior is exhibited by the starting materials used according to the invention, although of course with the upper limit of the temperature at 1200° C. no alite is expected to form. The raw materials are preferably low grade materials like concrete fines, overburden from quarries, low quality limestone, marl, dolomite and mixtures of such materials. Minerals and rocks suitable to make Portland cement, e.g. limestone, clay and bauxite, can be used, but are less preferred since they usually cost more. Typically, they are only used to adjust the Ca/Si ratio if used at all, therefore. One or more raw materials can be used to provide the starting material. Concrete fines from recycling concrete typically have a suitable Ca/Si ratio to provide the starting material on their own. If a raw material has a lower or higher ratio, the ratio in the starting material is adjusted by adding other raw material(s) with a higher or lower ratio, respectively. A preferred molar Ca/Si ratio is from 0.6 to 1.2. Besides Ca and Si, the starting material may contain up to 30% by weight other elements, calculated as oxides. Usually, one or more of up to 10% MgO, up to 10% $Al_2O_3$, up to 10% $Fe_2O_3$, up to 5% $Na_2O$, up to 5% $K_2O$, and up to 5% $SO_3$ constitute the other elements as well as traces of still others, especially of other metals, P, and halogens. It follows naturally, that for the targeted Ca/Si ratio, the content of elements depends on the amount of other elements, the sum of all always being 100% expressed as mass of oxides.

Assembly of the starting material follows the same principles as in Portland cement manufacturing, of course modified for the lower Ca/Si ratio according to the invention. This is general knowledge in the art, e.g. described in Taylor, mentioned above. Details about the influence of the sintering conditions are also found in chapter 3.4 of "Innovations in Portland cement manufacturing", edited by J. I. Bhatty, P C A 2011, for example. Influence of minor elements in the starting material is also explained in Lea's chemistry of cement, 4$^{th}$ edition 2004, chapter 5.4, for example.

The starting material and/or the raw material(s) can be ground in the same manner as is known for raw materials to manufacture Portland cement clinker, if needed. Often the raw materials will have an appropriate fineness. Suitable is e.g. a particle size where at least 50% of the particles are smaller than 90 µm and at least 95% are smaller than 200 µm.

The starting material is converted into the hydratable material by tempering, i.e. heating, at a temperature of 600 to 1200° C., preferably 800 to 1100° C. The temperature and residence time are chosen such that the amount of calcium in the transformed fraction of starting materials bound as free lime or calcium silicates with Ca/Si>1.5 is maximized. Suitable devices include rotary kilns, flash calciners, shaft kilns, ovens and other such devices allowing controlling of the residence time and temperature to allow control of the degree of transformation. The residence time ranges from 1 minute to 5 hours, preferably from 5 minutes to 3 hours, especially preferred 30 minutes to 2 hours. In some cases times from 1 minute to 10 min. are suitable for high tempering temperatures. Temperature and time are adapted to each other and the specific starting material so that the at least required 15%, preferably 18%, hydratable phases are obtained. This typically requires longer residence time for lower temperature and vice versa. The conversion of the starting material is kept to below or equal to 80% according to the invention contrary to what is deemed desirable for other cements. The concept of the partial conversion results as well in the presence of non-hydraulic and non-carbonatable phases (inert material). It is also usually beneficial to adjust conditions so that higher conversion takes place when the Ca/Si ratio is lower. A complete conversion resulting in e.g. only monocalcium silicate and quartz was found to provide a much less reactive binder, carbonation would be too slow. Thus, the binder made according to the invention differs significantly from Portland cement, slag cement, belite cements and similar binders optimized for hydration hardening. On the other hand, the binder made does not contain substantial amounts of phases that carbonate but do not hydrate as is the aim for known binders intended for carbonation hardening. Appropriate temperature and time setting for a given starting material are selected by one of ordinary skill in the art according to general knowledge analogously to the routine for manufacturing Portland cement. The conversion can easily be determined based on the routine analysis of the product obtained which is performed anyway.

The hydratable material obtained by partial conversion is subsequently cooled using typically air as the heat exchange medium, e.g. by grate cooler, counter flow cooler, or planetary cooler, to provide the binder. If needed the binder is ground to a fineness according to the determination of the particle size distribution by laser granulometry of $D_{90} \leq 90$ µm and preferably $D_{90} \leq 60$ µm, whereby the Rosin-Rammler Parameter (slope) n can vary from 0.6-1.4, and preferably from 0.7 to 1.2. Grinding can take place in any device known for OPC clinker grinding. It is also possible to add grinding aids such as, but not exclusively, monoethanolamine, diethanolamine, triethanolamine, triisopropanolamine, glycerine, ethylene glycol, diethylene glycol or polycarboxylate ethers.

The obtained binder is useful for construction material systems made by adding water and typically also aggregates as well as optionally additives and/or admixtures. According to the invention, building elements are manufactured by mixing the binder with water and placing the obtained binder paste. Placing typically comprises filling inside a mould or formwork or applying as mortar e.g. onto bricks or inside gaps to be repaired. The term building elements is to be understood broadly herein, denoting any structure obtained by placing a binder paste. Preferred building elements are precast concrete parts and concrete goods. However, the method is also useful to make foundations, walls, ceilings etc. from ready-mix or site-mixed concrete as well as for mortars, like masonry mortar and plaster mortar, for screed and other usual applications of Portland cement. As with Portland cement the further components of the binder paste besides water like aggregate, additives and admixtures are adapted to the specific use.

Often used admixtures are water reducing agents and plasticizers like for example, but not exclusively, organic compounds with one or more from carboxylate, sulfonate, phosphonate, phosphate or alcohol functional groups. These serve to achieve a good consistency, i.e. flowability, of the paste with a smaller amount of water. Since a decrease of water to binder ratio (w/b) normally provides an increase of strength, such admixtures are commonly used. Air entraining agents are also able to improve flowability and can be used for this aim or for other reasons such as, but not limited to, density modifications and compactability improvements.

Other admixtures that influence workability are retarders. They mainly aim at prolonging the time that a specified consistency is maintained. Retarders slow the setting and/or hardening of the binder paste. Suitable substances are for example, but not exclusively, phosphates, borates, salts of Pb, Zn, Cu, As, Sb, lignosulphonates, hydroxycarboxylic acids and their salts, phosphonates, sugars (saccharides). It is also possible to add admixtures that are designed to modify the rheology properties to control the setting time, i.e. plasticizers and super-plasticizers. Those can have a retarding effect as well, e.g. lignosulphonates and polycarboxylic acids.

Furthermore, it is possible to add activators that promote hydraulic reactivity of the hydratable phases and carbonation activity of the hydrates and anhydrous phases. Examples of such substances are alkali and alkaline earth metal hydroxides, nitrates, sulfates, chlorides, silicates, (hydro-)carbonates or organic compounds such as glycerin, organic acids and their salts, cyanates and amines e.g. triethanolamine, triisopropanolamine, diethanolisopropanolamine. It is to be noted that some of these admixtures may act as retarders and accelerators depending on the dosage. It is further noted that some of these admixtures might be added as grinding aids already during the grinding step.

Special admixtures can be added in order to improve the dissolution of the carbonate ions in the interacting solutions and consequently to accelerate the carbonation process. These can be e.g. aqueous solvents like alkanolamines, for example primary amines like monoethanolamine (MEA) and diglycolamine (DGA), secondary amines like diethanolamine (DEA) and diisopropanolamine (DIPA), and tertiary amines like methyldiethanolamine (MDEA) and triethanolamine (TEA), or mixtures thereof, halogenides, ethylenedinitrilotetraaccetic acid (EDTA), soluble alkali salts and hydroxides or other substances that improve dissolution of $CO_2$ in the solution. Additionally enzymes such as carbonic anhydrase can be used to enhance carbonation efficiency and modify the properties of the reaction products. It is to be noted that these admixtures have not only one action but can exercise a double role. They can modify the hydration process as well as modify the carbonation process and/or morphology and microstructure of the products formed. The effect can largely depend on the dosage.

Further, it is possible to add admixtures that modify the morphology of the precipitating calcite during the hydration—carbonation process. This provides the advantage of building less dense shales of hydrates-carbonates product and enables higher carbonation and hydration degrees. Suitable are for example magnesium salts, polyacrylic acid, polyacrylamide, polyvinyl alcohol, polyvinyl-sulfonic acids, styrenesulfonate, citric and other simple organic acids, polysaccharides, phosphonates, and polycarboxylates. It is to be noted that these admixtures have not only one action but can exercise a double role.

Moreover it is possible to add admixtures that regulate the pH during the hydration—carbonation process in order to enhance the precipitation of calcite. These include metal hydroxides and carbonates and similar substances.

All admixtures are used in the amounts known as such, wherein the amount is adapted to a specific binder and special needs in the known manner.

Additives are e.g. fillers, pigments, reinforcing elements, and self-healing agents. Typical fillers are mineral particles like stone dust as well as fibres such as glass, metal and/or polymer fibres. An addition which is also used as supplementary cementitious material is silica fume. All these can be added in the amounts known per se.

Suitable water content of the mixture is from 2 to 10 times the content calcium oxide in the mixture, all contents expressed in moles.

The construction material system obtained in this way hardens initially via hydration of the hydratable phases, which are usually mainly calcium silicates, calcium aluminates, calcium alumina ferrites, calcium ferrites as well as free lime, periclase and free iron oxides. The hydrates formed provide a setting and preliminary hardening within 1 minute to 24 hours, often within 1 minute to 2 hours, depending on application. A structure with sufficient green strength is thus formed enabling demoulding and/or further handling steps. Hydration consumes water and thereby creates pores in the structure by self-desiccation. A drying can be performed in parallel to hydration (e.g. hydration at relative humidity (RH) of 30 to 99%, preferably at about 60%) or subsequently.

Through the pores created by hydration the carbon dioxide is introduced into the construction material system to allow development of final strength by carbonation. Final strength of 2 to 100 MPa is typically reached within 10 minutes to 2 days, depending on application. The carbon dioxide can be supplied as gas or as, preferably aqueous, solution that accesses the pores formed by hydration. For example, an aqueous NaOH solution exposed to an atmosphere with at least 1% of $CO_2$ by volume is suitable for carbonation.

Carbonation using gaseous carbon dioxide typically relies on an increased carbon dioxide pressure, preferably 1 to 6 bar, more preferred 2 to 4 bar and most preferred at about 2.5 bar. The carbon dioxide concentration in the gas is suitably at least 1% by volume, preferably at least 5% by volume. Such an atmosphere is obtainable e.g. from flue gas. For use as site-mixed or ready-mix concrete or mortar where more than atmospheric pressure is difficult to provide a carbonation with carbon dioxide rich gas at atmospheric pressure can be used. The hardening takes longer, but still completes within acceptable times of 1 to 7 days. Carbonation using dissolved carbon dioxide is possible with building elements that can hold the solution while hardening. Suitable solutions contain from 0.01 to 1 M alkali salts and/or hydroxides and have an initial pH, i.e. before exposing them to the $CO_2$ rich atmosphere, between 8 and 14 accounting for the ionic strength of the solution.

In a preferred embodiment, carbonation takes place in the presence of an alkaline salt or hydroxide, like NaOH, or a polycarboxylic acid, like citric acid. It was surprisingly found that these substances enhance carbonation, i.e. more $CO_2$ is incorporated within a given time. The alkali salt or hydroxide or the carboxylic acid can be supplied by immersing the partly hydrated binder paste in an aqueous solution containing alkali salt or hydroxide or carboxylic acid. The alkali salt or hydroxide is advantageously used in such an amount that the pH of the solution before carbonation ranges from 8 to 14. The carboxylic acid is preferably used in an amount from 0.01 to 2% by weight of the solution. The alkali salt or hydroxide or the acid can also be a component of the binder.

The building elements obtained by using the binder differ from known products of hydration hardening through their content of bound carbon dioxide. In contrast to products of carbonation they have a high amount of bound water (BW). BW is defined as the mass loss of samples between 110° C. and 550° C. relative to the mass of initial non-hydrated and non-carbonated hydratable material. It is expressed in g per 100 g of hydratable material. Thermal gravimetry method is used to quantify these masses.

The extent of carbonation is quantified as a mass of $CO_2$ bound relative to the mass of initial non-hydrated and non-carbonated hydratable material. It is expressed in g per 100 g of hydratable material. The $CO_2$ mass is defined as the mass loss between 550° C. and 850° C.

DETAILED DESCRIPTION OF THE INVENTION

The invention will be illustrated further with reference to the examples that follow, without restricting the scope to the specific embodiments described. If not otherwise specified any amount in % or parts is by weight and in the case of doubt referring to the total weight of the composition/mixture concerned. A characterization as "approx.", "around" and similar expression in relation to a numerical value means that up to 10% higher and lower values are included, preferably up to 5% higher and lower values, and in any case at least up to 1% higher and lower values, the exact value being the most preferred value or limit. The invention further includes all combinations of described and especially of preferred features that do not exclude each other.

The term "substantially free" means that a particular material is not purposefully added to a composition, and is only present in trace amounts or as an impurity. As used herein, unless indicated otherwise, the term "free from" means that a composition does not comprise a particular material, i.e. the composition comprises 0 weight percent of such material.

Example 1

Recycled concrete fines (RCF) and limestone (L) from HeidelbergCement AG were used as raw materials. The properties of the raw materials are summarized in table 1.

TABLE 1

|  |  | Unit | RCF | L1 |
|---|---|---|---|---|
| Fineness | Blaine | cm²/g | 5460 | 3800 |
| Chemical composition XRF | LOI 1050° C. | % | 17.98 | 43.25 |
|  | SiO2 | % | 43.02 | 0.96 |
|  | Al2O3 | % | 6.38 | 0.25 |
|  | TiO2 | % | 0.32 | 0.01 |
|  | MnO | % | 0.069 | 0.06 |
|  | Fe2O3 | % | 3.02 | 0.22 |
|  | CaO | % | 24.39 | 54.21 |
|  | MgO | % | 1.39 | 0.89 |
|  | K2O | % | 0.80 | 0.03 |
|  | Na2O | % | 0.35 | 0.00 |
|  | SO3 | % | 1.21 | 0.02 |
|  | P2O5 | % | 0.18 | 0.01 |
|  | Sum | % | 99.11 | 99.91 |

From RCF and L1 two mixtures were made as starting materials:
CS0.6 with molar ratio Ca/Si=0.6 from 100% RCF and
CS1.0 with molar ratio Ca/Si=1.0 from 77% RCF and 23% L1.

The starting materials were made and homogenized in an Eirich mixer and tempered in a laboratory oven at temperatures in the range from 800-1200° C. for either 30 minutes or 60 minutes. The tempered materials were cooled in air down to room temperature. Table 2 lists the phase compositions in % by weight of the obtained binders for the different samples, temperatures, and times. All phase contents in this patent are based on XRD-Rietveld calculations if not stated otherwise. Note that the table contains only selected phases, the remaining content up to 100% is composed by other crystalline and amorphous phases either originally present in the precursor materials or formed during the tempering. The conversion was calculated as the molar amount of CS (wollastonite+pseudowollastonite) in the clinker relative to the moles of calcium oxide in all calcium-silicates and in free lime, i.e. the moles of Ca in C2S+CS+free lime. The calculation is based on the assumption that for the clinker characterized by Ca/Si<1.0 all calcium is bound in CS after complete conversion and hence CS/Ca (moles/moles) should be one for 100% conversion.

TABLE 2

| sample, temperature, time | lime | dicalcium silicate | wollastonite | pseudo-wollastonite | quartz | conversion |
|---|---|---|---|---|---|---|
| CS0.6, 800° C., 1 h | 1.5 | 18.9 | 1.9 |  | 33.9 | 0.09 |
| CS0.6, 900° C., 1 h | 3.5 | 28.3 | 5.6 | 2.8 | 28.8 | 0.23 |
| CS0.6, 1000° C., 1 h |  | 10.9 | 13.1 | 5.5 | 23.3 | 0.66 |
| CS0.6, 1100° C., 1 h |  | 1.9 | 20.0 | 10.0 | 21.0 | 0.92 |
| CS0.6, 1200° C., 1 h |  |  | 3.1 | 24.2 | 6.4 | 1.00 |
| CS0.6, 900° C., 0.5 h |  | 24.1 | 4.9 | 3.4 | 30.0 | 0.30 |
| CS0.6, 1000° C., 0.5 h |  | 14.1 | 9.3 | 3.6 | 27.0 | 0.47 |
| CS0.6, 1100° C., 0.5 h |  | 3.1 | 18.3 | 8.8 | 22.3 | 0.87 |
| CS1.0, 800° C., 1 h | 4.7 | 21.9 | 1.0 | 1.0 | 26.2 | 0.10 |
| CS1.0, 900° C., 1 h | 10.1 | 35.4 | 2.8 | 1.2 | 23.8 | 0.08. |
| CS1.0, 1000° C., 1 h | 3.0 | 43.8 | 3.1 | 1.0 | 18.8 | 0.08 |
| CS1.0, 1100° C., 1 h |  | 31.9 | 6.5 | 4.2 | 10.8 | 0.25 |
| CS1.0, 1200° C., 1 h |  | 3.5 | 27.7 | 27.7 | 2.5 | 0.96 |
| CS1.0, 900° C., 0.5 h | 11.6 | 22.6 | 2.4 | 2.4 | 25.2 | 0.10 |
| CS1.0, 1000° C., 0.5 h | 5.6 | 34.8 | 3.3 | 3.3 | 23.1 | 0.12 |
| CS1.0, 1100° C., 0.5 h |  | 44.2 | 4.9 | 3.0 | 16.9 | 0.14 |

It can be seen that the desired partial conversion of the starting material took place at appropriate combinations of temperature and residence time. For low Ca/Si ratio lower temperature and longer residence time are needed. With the higher ratio Ca/Si higher temperature and lower time are better. It is also evident that monocalcium silicate comes at the cost of the targeted hydratable phases so that a high amount of CS indicates unsuitable products. It is also visible that hydratable materials produced contain significant amounts of nonhydratable and non-carbonatable phase, i.e. quartz. The targeted composition of the novel partially transformed hydratable material was achieved.

Example 2

Binders were made analogously to example 1 from the low quality raw materials quarry overburden (Le, mainly loess) and limestone (L2), the compositions of which are listed in table 3.

TABLE 3

|  |  | Unit | Le | L2 |
|---|---|---|---|---|
| Chemical composition XRF | LOI 1050° C. | % | 15.6 | 36.79 |
|  | SiO2 | % | 54.49 | 10.69 |
|  | Al2O3 | % | 6.69 | 3.76 |
|  | TiO2 | % | 0.47 | 0.15 |
|  | MnO | % | 0.06 | 0.05 |
|  | Fe2O3 | % | 2.83 | 1.15 |
|  | CaO | % | 15.04 | 43.07 |
|  | MgO | % | 2.84 | 2.52 |
|  | K2O | % | 1.4 | 1.13 |

TABLE 3-continued

|  | Unit | Le | L2 |
|---|---|---|---|
| Na2O | % | 0.98 | 0.04 |
| SO3 | % | 0.01 | 0.6 |
| P2O5 | % | 0.13 | 0.04 |
| Sum | % | 99.94 | 99.99 |

The starting material contained either 70.6% quarry overburden and 29.4% limestone (samples CS0.6b, Ca/Si=0.6) or 48.0% quarry overburden and 52.0% limestone (samples CS1.0, Ca/Si=1.0). Tempering of the starting materials took place in a laboratory oven in the temperature range 900-1200° C. for 60 minutes. The tempered materials were cooled in air to room temperature. Table 4 lists the phase composition in % by weight of the obtained binder for the different samples and temperatures. Again, the table gives only selected phases, the remaining content up to 100% is composed by other crystalline and amorphous phases either originally present in the precursor materials or formed during the tempering

TABLE 4

| sample, temperature, time | lime | dicalcium silicate | wollastonite | pseudo-wollastonite | quartz | conversion |
|---|---|---|---|---|---|---|
| CS0.6 900° C. 1 h | 11.3 | 13 | 4.3 | 1.7 | 36.2 | 0.15 |
| CS0.6 1000° C. 1 h | 4.2 | 24.7 | 5.8 | 0.8 | 27.2 | 0.15 |
| CS0.6 1100° C. 1 h | 0.4 | 21.7 | 13.7 | — | 19.8 | 0.37 |
| CS0.6 1200° C. 1 h |  |  | 3.4 | 22.7 | 5.4 | 1.00 |
| CS1.0 900° C. 1 h | 15.5 | 21 | 3.4 | — | 22.7 | 0.06 |
| CS1.0 1000° C. 1 h | 9.9 | 31.9 | 3.4 |  | 15.3 | 0.05 |
| CS1.0 1100° C. 1 h | 2.8 | 44.7 | 6.1 | — | 10.9 | 0.10 |
| CS1.0 1200° C. 1 h |  | 23.4 | 0.4 | 11.1 | 1.4 | 0.35 |

It can be seen that the partial conversion provided hydratable material made by suitable combinations of starting material composition, temperature and residence time.

Example 3

Hardening of binders was examined. The clinkers CS0.6a (Ca/Si=0.6, 900° C., 1 h) and CS1.0a (Ca/Si=1.0, 1000° C., 30 minutes) were made like in example 1 and had the following phase compositions:
CS0.6a: 1.4% ferrite; 1.0% maghemite; 1.2% anhydrite; 3.5% lime; 0.5% periclase; 4.1% CA Na orthorhombic; 1.2% $C_{12}A_7$ (mayenite); 1.4% $C_2S$ gamma; 14.4% $C_2S$ beta; 8.4% bredigite; 17.0% $C_2AS$ (gehlenite); 0.8% akermanite; 4.3% anorthite; 28.8% quartz; 1.7% rankinite; 5.6% wollastonite 1T; 2.8% pseudo-wollastonite; 1.9% X ray amorphous; and
CS1.0a: 3.2% ferrite; 1.0% maghemite; 1.4% anhydrite; 5.4% lime; 0.7% periclase; 2.9% CA Na orthorhombic; 2.3% $C_{12}A_7$ (mayenite); 1.1% $C_2S$ gamma; 31.9% $C_2S$ beta; 5.1% bredigite; 13.8% $C_2AS$ (gehlenite); 1.1% akermanite; 3.6% anorthite; 20.8% quartz; 3.9% wollastonite 1T; 1.5% pseudo-wollastonite; 0.3% X ray amorphous.

The hydratable materials were ground in a laboratory planetary mill to a fineness according to the determination of the particle size distribution by laser granulometry of about $D_{90}$~50 μm and a Rosin-Rammler Parameter (slope) n of ~0.87. For hydration the binder obtained was mixed with water in a water/binder ratio of 0.5. Hydration took place at 50° C. for 24 h. It was followed by carbonation with ~100% $CO_2$ gas at a pressure of 2.5 bar and a temperature of 20° C. for 24 h. Comparison samples were exposed to ~100% $CO_2$ gas at a pressure of 2.5 bar and a temperature of 20° C. for 24 h without the initial hydration step.

The hydrated and the hardened products were analysed by thermogravimetry in a Netzsch Jupiter STA 449 device (DTG) and BW and $CO_2$ bound calculated as described above from the thermogravimetry measurements. Results are summarized in Tables 5 and 6.

TABLE 5

BW and bound CO2 for C/S = 0.6

| Treatment | | BW before carbonation | BW after carbonation | CO2 before carbonation | CO2 after carbonation |
|---|---|---|---|---|---|
| Hydration | Carbonation | g/100 g hydratable material | | | |
| — | 24 hours at ~100% CO2 at 2.5 bars, 20° C. | — | 3 | — | 10 |
| 24 hours at 50° C. | 24 hours at ~100% CO2 at 2.5 bars, 20° C. | 2 | 4 | 1 | 12 |

TABLE 6

BW and bound CO2 for C/S = 1.0

| Treatment | | BW before carbonation | BW after carbonation | CO2 before carbonation | CO2 after carbonation |
|---|---|---|---|---|---|
| Hydration | Carbonation | g/100 g hydratable material | | | |
| — | 24 hours at ~100% CO2 at 2.5 bars, 20° C. | — | 3 | — | 5 |

TABLE 6-continued

BW and bound CO2 for C/S = 1.0

| Treatment | | BW before carbonation | BW after carbonation | CO2 before carbonation | CO2 after carbonation |
|---|---|---|---|---|---|
| Hydration | Carbonation | g/100 g hydratable material | | | |
| 24 hours at 50° C. | 24 hours at ~100% CO2 at 2.5 bars, 20° C. | 5 | 3 | 1 | 14 |

Based on the TG results, it can be concluded that both hydratable materials hydrated. Subsequent carbonation led to significant $CO_2$ uptake and parallel ongoing hydration demonstrated by the presence of BW after the carbonation treatment. It is seen that the combined hydration and carbonation had a synergistic effect enhancing the amount of $CO_2$ bound and therewith strength under given conditions.

Example 4

The same binder with C/S=0.6 as in example 3 was used. The binder was hydrated identically to example 3, but carbonated immersed in 0.5 M NaOH-solution, all conditions being the same otherwise. The results of an analysis with thermogravimetry are compared in table 7 to results without NaOH-solution.

TABLE 7

| Treatment | | BW before carbonation | BW after carbonation | CO2 before carbonation | CO2 after carbonation |
|---|---|---|---|---|---|
| Hydration | Carbonation | g/100 g hydratable material | | | |
| 24 hours at 50° C. | 24 hours at ~100% CO2 at 2.5 bars, 20° C. | 2 | 3 | 1 | 11 |
| 24 hours at 50° C. | 24 hours at ~100% CO2 at 2.5 bars, 20° C., in 0.5 M NaOH solution | 2 | 4 | 1 | 13 |

It is seen that the carbonation was further enhanced by the presence of alkali hydroxide in the solution. This effect is associated with the presence of alkalis. Hence, the alkali source is not limited to hydroxides and sodium. Suitable alkali sources comprise soluble alkali-containing salts as well. Additionally, the presence of alkalis enhanced the ongoing hydration demonstrated by the increase of BW.

Example 5

The same binder with C/S=1.0 as in example 3 was used. The binder was hydrated identically to example 3, but carbonated immersed in 0.5 M NaOH-solution, all conditions being the same otherwise. The results of an analysis with thermogravimetry are compared in table 8 to results without NaOH-solution

TABLE 8

| Treatment | | BW before carbonation | BW after carbonation | CO2 before carbonation | CO2 after carbonation |
|---|---|---|---|---|---|
| Hydration | Carbonation | g/100 g hydratable material | | | |
| 24 hours at 50° C. | 24 hours at ~100% CO2 at 2.5 bars, 20° C. | 5 | 3 | 1 | 14 |
| 24 hours at 50° C. | 24 hours at ~100% CO2 at 2.5 bars, 20° C., in 0.5 M NaOH solution | 5 | 6 | 1 | 16 |

It is seen that the carbonation was further enhanced by the presence of alkali hydroxide in the solution. This effect is associated with the presence of alkalis. Hence, the alkali source is not limited to hydroxides and sodium. Suitable alkali sources comprise soluble alkali-containing salts as well. Additionally, the presence of alkalis enhanced the ongoing hydration demonstrated by the increase of BW.

Example 6

The same binder with C/S=1.0 as in example 3 was used and mixed with 1% citric acid solution instead of water. Hydration, drying and carbonation took place as in example 3. The results of an analysis with thermogravimetry including those of example 3 are shown in table 9.

TABLE 9

| Treatment | | BW before carbonation | BW after carbonation | CO2 before carbonation | CO2 after carbonation |
|---|---|---|---|---|---|
| Hydration | Carbonation | g/100 g hydratable material | | | |
| 24 hours at 50° C. | 24 hours at ~100% CO2 at 2.5 bars, 20° C. | 5 | 3 | 1 | 14 |
| 24 hours at 50° C. in 1% citric acid solution instead of mixing water | 24 hours at ~100% CO2 at 2.5 bars, 20° C. | 5 | 6 | 2* | 18 |

It can be seen that immersion in citric acid further enhanced the combined hydration-carbonation hardening.

Example 7

Hardening of binders prepared by tempering of a mixture of the natural materials quarry overburden (mainly loess) and limestone was examined. The clinkers CS0.6b (Ca/Si=0.6, 1000° C., 1 h) and CS1.0b (Ca/Si=1.0, 1000° C., 1 h) were made like in example 2 and had the following phase compositions:
CS0.6b: 3.1% ferrite; 0.8% maghemite; 0.7% arcanite; 0.9% Ca-langbeinite; 4.2% lime; 2.0% periclase; 24.7% dicalcium silicate; 7.5% gehlenite; 6.5% akermanite; 2.7% anorthite; 2.5% ortoclas; 2.5% albite; 27.2% quartz; 5.8% wollastonite; 0.8% pseudo-wollastonite; 8.1% X-ray amorphous; and CS1.0b: 4.6% ferrite; 0.8% hematite; 9.9% lime; 2.4% periclase; 31.9% dicalcium silicate; 0.3% mayenite, 6.3% gehlenite; 4.3% akermanite; 1.9% anorthite; 0.3% crystobalite; 15.3% quartz; 3.4% wollastonite; 18.6% X-ray amorphous.

The hydratable materials were ground in a laboratory planetary mill to a fineness according to the determination of the particle size distribution by laser granulometry of about $D_{90}$~50 µm and the Rosin-Rammler Parameter (slope) n~0.87. For hydration the binder obtained was mixed with water in a water/binder ratio of 0.5. Hydration took place at 50° C. for 24 h. It was followed by carbonation with ~100% $CO_2$ gas at a pressure of 2.5 bar and a temperature of 20° C. for 24 h. The results of an analysis with thermogravimetry including those of example 3 are shown in table 10.

TABLE 9

| Hydratable material | BW before carbonation | BW after carbonation | CO2 before carbonation | CO2 after carbonation |
|---|---|---|---|---|
| | g/100 g hydratable material | | | |
| CS0.6b | 3 | 3 | 1 | 14 |
| CS1.0b | 6 | 4 | 1 | 15 |

Based on the TG results, it can be concluded that both hydratable materials hydrated. Subsequent carbonation led to significant $CO_2$ uptake and parallel ongoing hydration demonstrated by the presence of BW after the carbonation treatment. It is seen that both materials hardened comparably to materials in example 3 demonstrating that the origin of precursor materials does not play a crucial role and the hydration, carbonation and hardening behavior is related to the phases present after the tempering step.

Example 8

Hardening of binders prepared from identical precursor materials by tempering at different temperatures was examined and compared to pure commercially available wollastonite. Hydratable materials from example 1 with C/S=1.0 tempered for 60 minutes at 800° C. or for 60 minutes at 900° C. or for 60 minutes at 1000° C. or for 60 minutes at 1200° C. were examined. The wollastonite was a commercial product with fineness provided by producer characterized by D90=43 µm, D10=1.5 µm. The chemical composition was provided by the producer as: SiO2 51%; Al2O3 1%; Fe2O3 0.3%; CaO 45%; MgO 1%; Na2O+K2O 0.1%; loss on ignition at 1000° C. 2%.

The hydratable materials were ground in a laboratory planetary mill to a fineness according to the determination of the particle size distribution by laser granulometry of about $D_{90}$~50 µm and the Rosin-Rammler Parameter (slope) n~0.87. The wollastonite was used as received. For hydration the binder obtained was mixed with water in a water/binder ratio of 0.5. Hydration took place at 60° C. for 12 h. It was followed by carbonation with ~100% $CO_2$ gas at a pressure of 4 bar and a temperature of 20° C. for 2 h. Samples were characterized by thermogravimetry and their BW and $CO_2$ bound calculated as previously described. Results are summarized in table 10.

TABLE 10

| Hydratable material | BW before carbonation | BW after carbonation | CO2 before carbonation | CO2 after carbonation |
|---|---|---|---|---|
| | g/100 g hydratable material | | | |
| CS1.0 tempered for 60 minutes at 800° C. | 4 | 5 | 7* | 14** |
| CS1.0 tempered for 60 minutes at 900° C. | 6 | 4 | 1 | 11 |
| CS1.0 tempered for 60 minutes at 1000° C. | 5 | 6 | 1 | 16 |
| CS1.0 tempered for 60 minutes at 1200° C. | 0 | 1 | 0 | 10 |
| Wollastonite | not measured | 0 | 2*** | 2 |

*hydratable material contains 16% of calcite and dolomite because of low transformation degree
**corresponds to an increase of $CO_2$ of 7 g /100 g of hydratable material
***calculated from producers data The results show that the hydratable material tempered for 60 minutes at 1000° C. which has the highest content of lime+dicalcium silicates has the optimal composition among the materials investigated demonstrated by its highest BW after carbonation and the highest $CO_2$ bound. Increasing the tempering temperature further results in a higher conversion, i.e. degree of transformation out of the optimum range and hence in phases of lower reactivity. Similarly, decreasing the tempering temperature and hence the transformation degree results in lower content of reactive phases and hence in lower BW and $CO_2$ bound. Wollastonite has neither hydrated nor carbonated under the given conditions which is in accordance with R. Berger and J. F. Young, "Reaction of Calcium Silicates with Carbon Dioxide and Water," ILLINOIS UNIV AT URBANA-CHAMPAIGN, 1979.

What is claimed is:

1. A method for manufacturing a binder comprising a hydratable material comprising the steps:
    providing a starting material from one or more raw materials convertible by tempering at 600 to 1200° C. into the hydratable material, wherein the starting material has a Ca/Si molar ratio from 0.5 to 1.8 and contains no or up to 30% by weight of other elements than CaO and $SiO_2$ with regard to the total mass calculated as oxides,
    tempering the starting material at a temperature in the range from 600 to 1200° C. during a residence time from 1 minute to 5 hours to provide the hydratable material containing crystalline hydratable phases, not more than 10% by weight monocalcium silicate and at least 15% by weight hydratable phases in the form of lime and dicalcium silicate, wherein at least 50% of the crystalline hydratable phases are dicalcium silicate,
    wherein the residence time and the tempering temperature are adapted to obtain the said hydratable material by converting not more than 80% by weight of the starting material, and cooling the hydratable material to provide the binder comprising the hydratable material.

2. The method according to claim 1, further comprising grinding the binder to a fineness characterized by a particle size distribution and a Rosin-Rammler Parameter (slope) n, wherein according to a determination of the particle size distribution of the binder by laser granulometry the binder has a $D_{90} \leq 90$ µm, whereby the Rosin-Rammler Parameter (slope) n can vary from 0.6-1.4.

3. The method according to claim 1, wherein the hydratable material contains at least 15% by weight dicalcium silicate, less than 10% by weight monocalcium silicate, and from 20 to 80% by weight phases from the raw materials and/or formed during the tempering.

4. The method according to claim 1, wherein the starting material has a Ca/Si molar ratio from 0.6 to 1.2.

5. The method according to claim 3, wherein the tempering temperature ranges from 800 to 1100° C. and the residence time ranges from 5 minutes to 2 hours.

6. The method according to claim 1, wherein the raw materials are selected from the group consisting of concrete fines, overburden from quarries, low quality limestone, marl, and dolomite.

7. The method according to claim 1, wherein the tempering temperature is adjusted to range from 900 to 1100° C. for residence times from 5 minutes to 1 hour.

8. The method according to claim 1, wherein the tempering temperature is adjusted to range from 800 to 1000° C. for residence times from 30 minutes to 2 hours.

9. The method according to claim 3, wherein the starting material has a Ca/Si molar ratio from 0.6 to 1.3.

10. The method according to claim 4, wherein the tempering temperature ranges from 850 to 1050° C. and the residence time ranges from 5 minutes to 2 hours.

11. The method according to claim 4, wherein the tempering temperature is adjusted from 900 to 1100° C. for residence times from 5 minutes to 1 hour or to range from 800 to 1000° C. for residence times from 30 minutes to 2 hours.

12. The method for manufacturing a building element from a binder comprising a hydratable material comprising the steps:
providing a starting material from one or more raw materials convertible by tempering at 600 to 1200° C. into the hydratable material, wherein the starting material has a Ca/Si molar ratio from 0.5 to 1.8 and contains no or up to 30% by weight of other elements than Ca and Si with regard to the total mass calculated as oxides,
tempering the starting material at a temperature in the range from 600 to 1200° C. during a residence time from 1 minute to 5 hours to provide the hydratable material containing hydratable phases, not more than 10% by weight monocalcium silicate and at least 15% by weight hydratable phases in the form of lime and dicalcium silicate, wherein at least 50% of the hydratable phases are dicalcium silicate, wherein the residence time and the tempering temperature are adapted to obtain the said hydratable material by converting not more than 80% by weight of the starting material,
cooling the hydratable material to provide the binder comprising the hydratable material
grinding the binder to a fineness characterized by a particle size distribution and a Rosin-Rammler Parameter (slope) n, wherein according to a determination of the particle size distribution of the binder by laser granulometry the binder has a $D_{90} \leq 90$ μm, whereby the Rosin-Rammler Parameter (slope) n can vary from 0.6-1.4
mixing the binder with water to obtain a binder paste
placing the binder paste
hydrating the binder paste until an amount of bound water is at least 5% of hydraulic phases mass in dry binder and
carbonating the binder paste until an amount of additionally bound carbon dioxide is at least 150% of an initially bound water mass or the strength exceeds 2 MPa while still keeping the amount of bound water at least 50% of the initially bound water mass.

13. The method according to claim 12, wherein the building element is a precast concrete part or concrete good.

14. The method according to claim 12, wherein placing comprises filling the binder paste into a mold or formwork.

15. The method according to claim 12, wherein carbonation is carried out with gaseous carbon dioxide.

16. The method according to claim 15, wherein the gaseous carbon dioxide is supplied with a pressure from atmospheric pressure to 6 bar, with a carbon dioxide concentration of at least 1% by volume.

17. The method according to claim 12, wherein carbonation is carried out with carbon dioxide dissolved during the carbonation process in an aqueous alkaline solution.

18. The method according to claim 17, wherein the solution has initially a pH in the range from 8 to 14 accounting for an activity index of $OH^-$.

19. The method according to claim 12, wherein carbonation is carried out with carbon dioxide dissolved during the carbonation process in an aqueous solution comprising substances improving dissolution of calcium ions.

20. The method according to claim 12, wherein carbonation is carried out with carbon dioxide dissolved during the carbonation process in an aqueous solution comprising substances improving dissolution of carbonate ions.

21. The method according to claim 12, wherein the fineness of the binder is $D_{90} <$ μm or the Rosin-Rammler Parameter n varies from 0.7 to 1.2 if the binder is coarser.

22. The method according to claim 16, wherein the gaseous carbon dioxide is supplied with a pressure from 2 to 4 bar with a carbon dioxide concentration of at least 5% by volume.

* * * * *